United States Patent [19]
Jaquess

[11] Patent Number: 5,824,239
[45] Date of Patent: Oct. 20, 1998

[54] METHOD TO REMOVE BIGUANIDE FROM AN AQUEOUS SOURCE

[75] Inventor: Percy A. Jaquess, Tigrett, Tenn.

[73] Assignee: Buckman Laboratories International, Inc., Memphis, Tenn.

[21] Appl. No.: 911,167

[22] Filed: Aug. 14, 1997

[51] Int. Cl.⁶ ................................. C02F 5/02; C02F 5/08
[52] U.S. Cl. ..................... 252/175; 210/702; 210/754; 210/756; 252/186.1; 252/187.23; 252/187.24; 252/187.25; 252/187.26; 252/187.27; 252/187.31; 422/15; 422/31; 422/37; 423/306; 423/314; 564/233; 564/234; 564/235
[58] Field of Search ..................... 210/702, 754, 210/756; 252/175, 186.1, 187.23, 187.24, 187.25, 187.26, 187.27, 187.31; 422/15, 31, 37; 423/306, 314; 564/233, 234, 235

[56] References Cited

U.S. PATENT DOCUMENTS 5,449,658   9/1995   Unhoch et al. .................. 504/151

*Primary Examiner*—Peter O'Sullivan
*Attorney, Agent, or Firm*—Armstrong, Westerman, Hattori, McLeland & Naughton

[57] ABSTRACT

A method for removing biguanide from aqueous sources, such as swimming pools, is disclosed. The method includes the steps of bringing at least one polymeric metaphosphate into contact with the aqueous source in a sufficient concentration to form particles containing the biguanide. The particles containing at least a portion of the biguanide can then be removed by various means, including filtration or vacuuming.

18 Claims, No Drawings

METHOD TO REMOVE BIGUANIDE FROM AN AQUEOUS SOURCE

BACKGROUND OF THE INVENTION

The present invention relates to the removal of biguanide from aqueous sources, such as swimming pools.

Biguanide is used as a non-chlorine swimming pool treatment to control the spread of microbes. It is generally believed that biguanide exhibits cationic properties, wherein the nitrogen atoms present in the biguanide polymer exhibit a positive charge. In controlling microorganisms, the biguanide attaches to the negatively charged membrane of the microorganism and the charged nitrogen acts to disrupt the transfer of hydrogen ions by disrupting membrane phospholipids in the cell of the microorganism. As a result, the microorganism uses up all of its energy in the form of ATP (Adenosine Triphosphate) and eventually dies.

While biguanide has these advantageous properties, it is generally understood that when the parts per million of biguanide falls below 50 ppm, some semi-resistant strains of microorganisms can exist. In order to combat these semi-resistant strains of microorganisms, a hypo-chloride ejection is used which is also known as a shock treatment. The hypo-chloride reacts, however, with the biguanide, to form a dispersion wherein the chloride ions surround the nitrogen in the biguanide. Generally, the chloride ions do not displace all of the water molecules around the polymer and thus a dispersion occurs. Light refracts on the polymer chain of the dispersion and makes the water appear milky which is an undesirable effect, especially in swimming pools. Accordingly, one way to remove biguanide from the pool before any shock treatment with a chlorine-based compound is by oxidation which takes a number of days, for example approximately 14 days. Obviously, such a waiting period is undesirable.

SUMMARY OF THE INVENTION

A feature of the present invention is to provide a method to remove at least a portion of biguanide from aqueous sources, such as swimming pools.

Another feature of the present invention is to provide a method of not only removing biguanide from an aqueous source, but doing so in an amount of time that is less than 14 days.

Additional features and advantages of the present invention will be set forth in part in the description which follows, and in part will be apparent from the description, or may be learned by practice of the present invention. The objectives and other advantages of the present invention will be realized and attained by the written description and appended claims.

To achieve these and other advantages, and in accordance with the purpose of the present invention, as embodied and broadly described herein, the present invention relates to a method for removing at least a portion of biguanide from an aqueous source which includes the step of introducing a composition containing a polymeric metaphosphate to an aqueous source containing biguanide in a sufficient amount to form particles containing the biguanide.

It is to be understood that both the foregoing general description and the following detailed description are exemplary and explanatory only and are intended to provide further explanation of the present invention, as claimed.

DETAILED DESCRIPTION OF THE INVENTION

The present invention involves the removal of biguanide or biguanide polymer from an aqueous source by bringing a composition comprising at least one polymeric metaphosphate into contact with the aqueous source. Biguanide is also known as imidodicarbonimidic diamide and has the formula $C_2H_7N_5$. For purposes of the present invention, biguanide includes polymerized versions and also includes the hydrochloride ($C_2H_7N_5.HCl$), the neutral sulfate (($C_2H_7N_5)_2.H_2SO_4.2H_2O$), and the acid sulfate ($C_2H_7N_5.H_2SO_4.H_2O$) versions and polymerized versions thereof.

For purposes of the present invention, an aqueous source is any source containing water or which is water-based or aqueous-based. For example, the aqueous source can be a swimming pool, a hot tub, a pond, a jacuzzi, a cooling tower, and the like. Preferably, the aqueous source is a swimming pool.

The polymeric metaphosphate is preferably sodium polymetaphosphate having the formula $(NaPO_3)_x$ wherein x is 3 or more. More preferably x is from about 3 to about 25, more preferably from about 6 to about 20 or from about 10 to about 20. A mixture of two or more polymeric polymetaphosphates can also be used for purposes of the present invention. Preferably, the polymeric metaphosphate is a sodium hexametaphosphate which is available from Albright and Wilson Americas, Glen Allen, Va. The product sold by Albright and Wilson further classifies the sodium hexametaphosphate with the product formulation name: metaphosphoric acid, hexasodium salt. The technical grade crushed SC is preferred. For any polymeric metaphosphate used in the present invention, a granular material is preferred which has a mesh range of from about 60 to about 100 mesh, more preferably from about 60 to about 80 mesh.

The polymeric metaphosphate or a composition containing the polymeric metaphosphate can be added in granular form directly into the aqueous source. For instance, when the aqueous source is a swimming pool, the granular material can be simply added directly into the swimming pool and the granular material will then dissolve and/or disperse in the swimming pool with some agitation. Alternatively, the polymeric metaphosphate can be first dissolved or partially dissolved in an aqueous solution (separate from the aqueous source containing the biguanide) and then the dissolved or partially dissolved polymeric metaphosphate solution or slurry can then be added to the aqueous source containing the biguanide. If a high concentration of polymeric metaphosphate is present in the aqueous solution or slurry, a stabilizer can also be added to prevent any depolymerization of the polymeric metaphosphate. An example of such a stabilizer is polyvinyl pyrrolidone aqueous slurry and/or a hydric alcohol, such as glycerol.

The polymeric metaphosphate(s) can be present in any concentration in the aqueous source to remove at least a portion of the biguanide present in the aqueous source. Preferably, when approximately 50 ppm of biguanide is present in an aqueous source, it is preferred to add a sufficient amount of polymeric metaphosphate so that the polymeric metaphosphate is present in the aqueous source at a concentration of from about 1 ppm to about 30 ppm and more preferably from about 5 ppm to about 25 ppm and most preferably from about 20 ppm to about 25 ppm. The polymeric metaphosphate, when present in the aqueous source at sufficient quantities, causes particles to form which contain biguanide and/or precipitate biguanide out of the aqueous source thus making it easy to remove the biguanide either by filtration, vacuuming, or other means of particulate removal known to those skilled in the art. With the use of polymeric metaphosphate, the flocculation that occurs precipitates out of solution and is generally in the form of particles or aggregates which are a non-sticky, non-slippery solid which allows for easy removal.

Without wishing to be bound by any theory, it is believed that the oxygen molecules in the polymeric metaphosphate surround the charged nitrogen atoms in the biguanide and the polymeric metaphosphate displaces most of the water molecules surrounding the biguanide. Further, it is believed that the polymeric metaphosphate allows the cross-linking of biguanide polymer chains which further enhances the expelling of water between the polymer chains of the biguanide.

With the use of the polymeric metaphosphate, the time frame for removing the biguanide is considerably improved and is generally less than 2 days. Further, with appropriate amounts of the polymeric metaphosphate present in the aqueous source, the polymeric metaphosphate is capable of precipitating more than 99.95% of the biguanide present in an aqueous source in less than 24 hours.

Also, the present invention permits a user the flexibility to try biguanide instead of chlorine-based compositions such as chlorine or chlorine dioxide and if the user wishes to switch back to the use of a chlorine-based composition, the present invention allows the user to convert to the use of a chlorine-based composition in a very short time period.

The present invention will be further clarified by the following example, which is intended to be purely exemplary of the present invention.

EXAMPLE

In an aqueous circulation tank containing water from Memphis city water, polyiminoimidocarbonyliminoimido carbonyliminohexametaylene HCl, also known as polymerized biguanide; was added in sufficient amounts to have a concentration of about 50 ppm.

Sodium hexametaphosphate (CAS Registry No. 10124-56-8) obtained from Albright and Wilson Americas, Glen Allen, Va., was added to the aqueous circulation tank in a sufficient amount to be present at a concentration of from about 20 to about 25 ppm. This dosage was converted to be approximately 1 part by weight $(NaPO_3)_x$ to 2 parts biguanide.

After the addition of the sodium hexametaphosphate, the water in the aqueous circulation tank was agitated for several minutes until particles formed into a large enough size to fall out of or precipitate out of solution. The particles were white in color. The water was then tested to determine the parts per million of biguanide in the aqueous circulation tank after removal of the white particles and it was determined that at least 99.95% by weight of the biguanide was removed.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method to remove at least a portion of biguanide present in an aqueous source comprising the step of bringing a composition comprising at least one polymeric metaphosphate into contact with the aqueous source in a sufficient amount to form particles comprising biguanide.

2. The method of claim 1, wherein said polymeric metaphosphate is a sodium polymetaphosphate.

3. The method of claim 1, wherein said polymeric metaphosphate is a mixture of polymeric metaphosphates.

4. The method of claim 1, wherein said polymeric metaphosphate is present in said aqueous source at a concentration of from about 1 ppm to about 30 ppm.

5. The method of claim 1, wherein said polymeric metaphosphate is present in the aqueous source at a concentration of from about 20 ppm to about 25 ppm.

6. The method of claim 1, wherein said polymeric metaphosphate is brought into contact with said aqueous source by adding said composition in granular form to the aqueous source.

7. The method of claim 1, wherein said polymeric metaphosphate is brought into contact with the aqueous source by adding an aqueous solution or slurry comprising said composition.

8. The method of claim 1, wherein said at least one polymeric metaphosphate has the formula $(NaPO_3)_x$, where x has the value of at least 3.

9. The method of claim 8, wherein x has a value from 3 to 25.

10. The method of claim 8, wherein x has a value from 6 to 20.

11. The method of claim 8, wherein x has a value from 10 to 20.

12. The method of claim 1, wherein said aqueous source is a swimming pool, a pond, a hot tub, or a jacuzzi.

13. The method of claim 1, wherein said aqueous source is a swimming pool.

14. The method of claim 1, further comprising the step of removing said particles from the aqueous source.

15. The method of claim 14, wherein said particles are removed by vacuuming.

16. The method of claim 14, wherein said particles are removed by filtration.

17. The method of claim 1, further comprising treating said aqueous source with a chlorine-based composition or a derivative thereof after the formation of the particles.

18. The method of claim 1, further comprising the step of removing said particles and treating said aqueous source with a chlorine-based composition or a derivative thereof.

* * * * *